United States Patent [19]

O'Berto et al.

[11] 4,051,418
[45] Sept. 27, 1977

[54] THREE PHASE A.C. MOTOR DRIVE SYSTEM

[76] Inventors: Gerald N. O'Berto, 850 Lorraine Road, Wheaton, Ill. 60187; Gisuke Murakami, 496 Imaiminami-cho, Nakahara, Kawasaki, Japan, 211

[21] Appl. No.: 627,980

[22] Filed: Nov. 3, 1975

[51] Int. Cl.² .................................................. H02P 5/40
[52] U.S. Cl. .................................... 318/227; 318/230; 318/231; 318/269; 363/56
[58] Field of Search ............... 318/227, 230, 231, 269; 321/14

[56] References Cited

U.S. PATENT DOCUMENTS

| | | | |
|---|---|---|---|
| 3,538,420 | 11/1970 | Klein | 318/227 X |
| 3,700,989 | 10/1972 | Jensen | 318/227 |
| 3,775,651 | 11/1973 | Graf et al. | 318/227 |
| 3,878,445 | 4/1975 | Kirkham et al. | 318/227 X |
| 3,893,006 | 7/1975 | Algeri et al. | 321/14 |
| 3,947,736 | 3/1976 | Byers | 318/227 |
| 3,947,748 | 3/1976 | Klein | 321/14 X |
| 3,967,173 | 6/1976 | Stich | 318/227 |

*Primary Examiner*—Gene Z. Rubinson
*Attorney, Agent, or Firm*—Leydig, Voit, Osann, Mayer & Holt, Ltd.

[57] ABSTRACT

A system for controlling the speed, torque and power of three phase a.c. motor. A binary logic circuit generates a variable frequency three phase signal which controls three driver pairs in an inverter to selectively apply either the positive voltage or the negative voltage of a direct current power source to each of the three motor phases. The three phase binary driver control signal is pulse frequency modulated below 60 cycles per second to operate the motor in a constant torque mode without varying the rectifier output voltage. The logic control signal also includes a delay to protect the drivers by assuring that one driver of a pair is "off" prior to turning the other driver "on". In addition the system comprises high response voltage and current limiting circuits to protect the system and to reduce the overcapacity requirement of the components. An accelerator/decelerator circuit achieves a nearly linear characteristic through the use of switching transistors to permit substantial cost savings.

2 Claims, 6 Drawing Figures

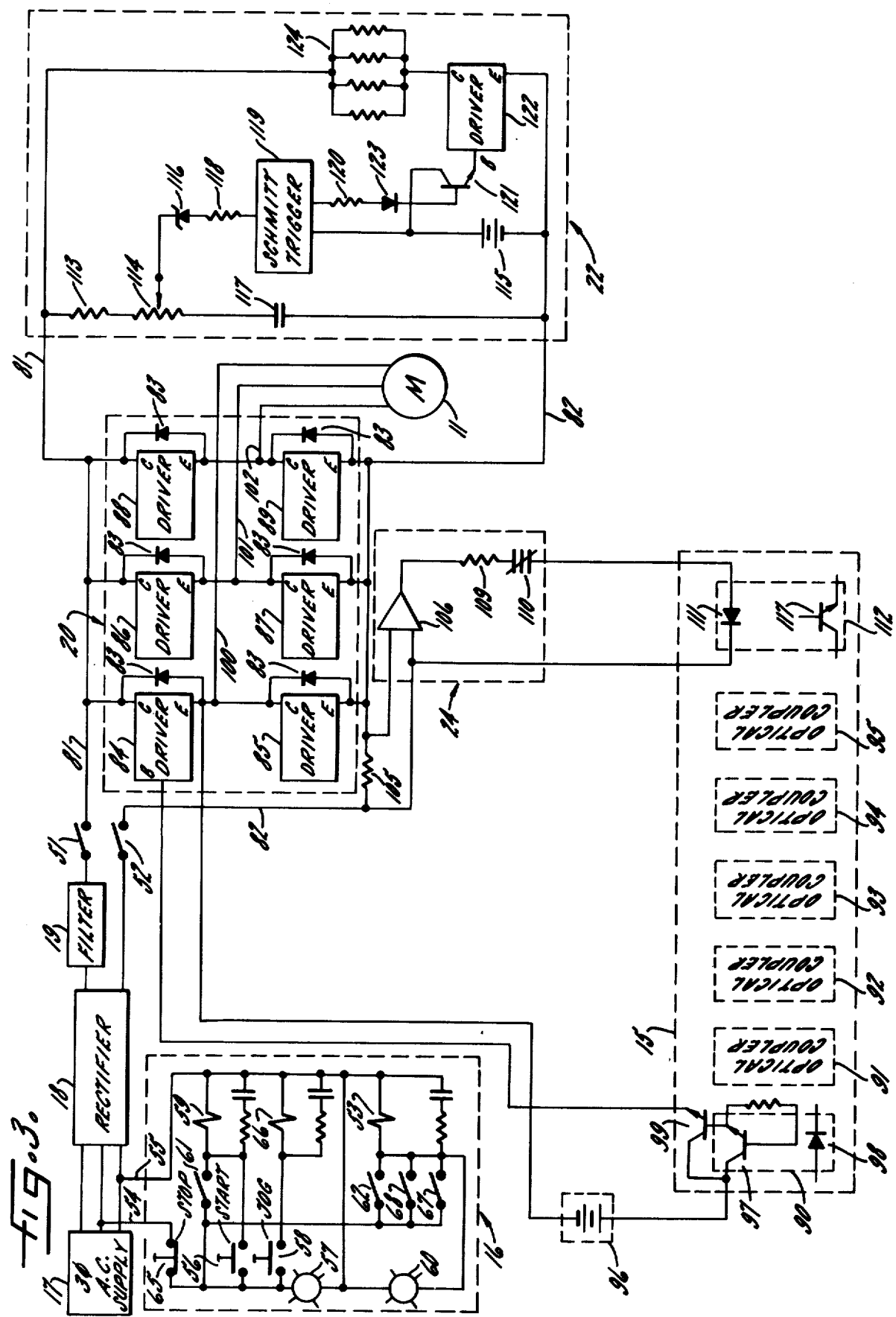

THREE PHASE A.C. MOTOR DRIVE SYSTEM

DESCRIPTION OF THE INVENTION

The present invention relates to a variable speed control system for three phase a.c. motors.

The speed of a.c. motors varies with the frequency of the signal applied. Typically, this is achieved by rectifying and filtering a standard three phase supply to produce direct current and then "inverting" the direct current to produce alternating current of the necessary frequency.

The power of an a.c. motor is a function of the voltage characteristic of the a.c. supply. Maintaining a constant voltage characteristic while varying the frequency of the a.c. supply will result in a constant power output from the motor. On the other hand, if the current to the motor is maintained at a constant level while the frequency is varied, the motor will supply constant torque.

As a general rule, a.c. motors may be operated in a constant power (constant voltage) mode only at speeds in excess of their standard 60 hertz operating speed. At operating speeds below that resulting from a 60 hertz supply, the motors must be operated in a constant torque (constant current) mode to avoid overheating.

There are two types of constant torque (constant current) variable speed a.c. driven systems in common usage. One is generally referred to as a "current source" system, while the other is referred to as a "voltage source" system. A current source system is especially suited for a constant torque operating mode. By setting the current source to supply a fixed current and by utilizing a three phase motor signal characterized by the application of current to only one phase at a time, only the frequency of the signal need be varied to achieve a variable speed, constant torque operation. Nevertheless, current source systems have several disadvantages, including rough operation at low speeds due in part to the energization of only one phase at a time. Voltage source systems have an overlap, typically 60°, between the application of current to one phase and the cessation of current in the preceding phase.

In a voltage source system constant current may be achieved by varying the voltage characteristic proportionally to the frequency. Such as system has the disadvantage that not only the frequency but also the voltage characteristic must be varied. The latter is generally accomplished either through phase controlled SCR's or by chopping the a.c. supply to the rectifier. These techniques are often expensive, physically large and/or lack the required reliability and stability.

It is a primary object of the present invention to provide a variable frequency constant torque a.c. drive system which is reliable, compact, and economical through the elimination of the analog techniques of phase control and rectifier input "chopping".

It is another object of the present invention to provide a variable frequency constant torque a.c. drive system in which the control circuitry may be reduced to a single integrated circuit.

A further object of the present invention is to provide a variable frequency a.c. drive system in which the inverter is protected from short circuits.

Still another object of the present invention is to provide a variable frequency a.c. drive system with nearly linear acceleration and deceleration without the use of constant current circuitry.

Yet another object of the present invention is to provide a variable frequency a.c. drive system having reliable overcurrent protection with a very low response time. In this connection, a related object of the invention is to provide such a system that can be manufactured with components having very little overload capacity, thereby permitting the system to be manufactured at a relatively low cost.

A still further object of the invention is to provide such an improved variable frequency a.c. drive system which permits the use of standard switching transistors in the inverter.

Another object of the invention is to provide such an improved variable frequency a.c. drive system which is readily adaptable for use with motors of different powers by changing a relatively small number of components.

Other objects and advantages of the present invention will be apparent from the following detailed description taken in connection with the accompanying drawings, in which:

FIG. 3 is a more detailed block and circuit diagram of the power circuitry of the system illustrated in FIG. 1;

Figure 1:
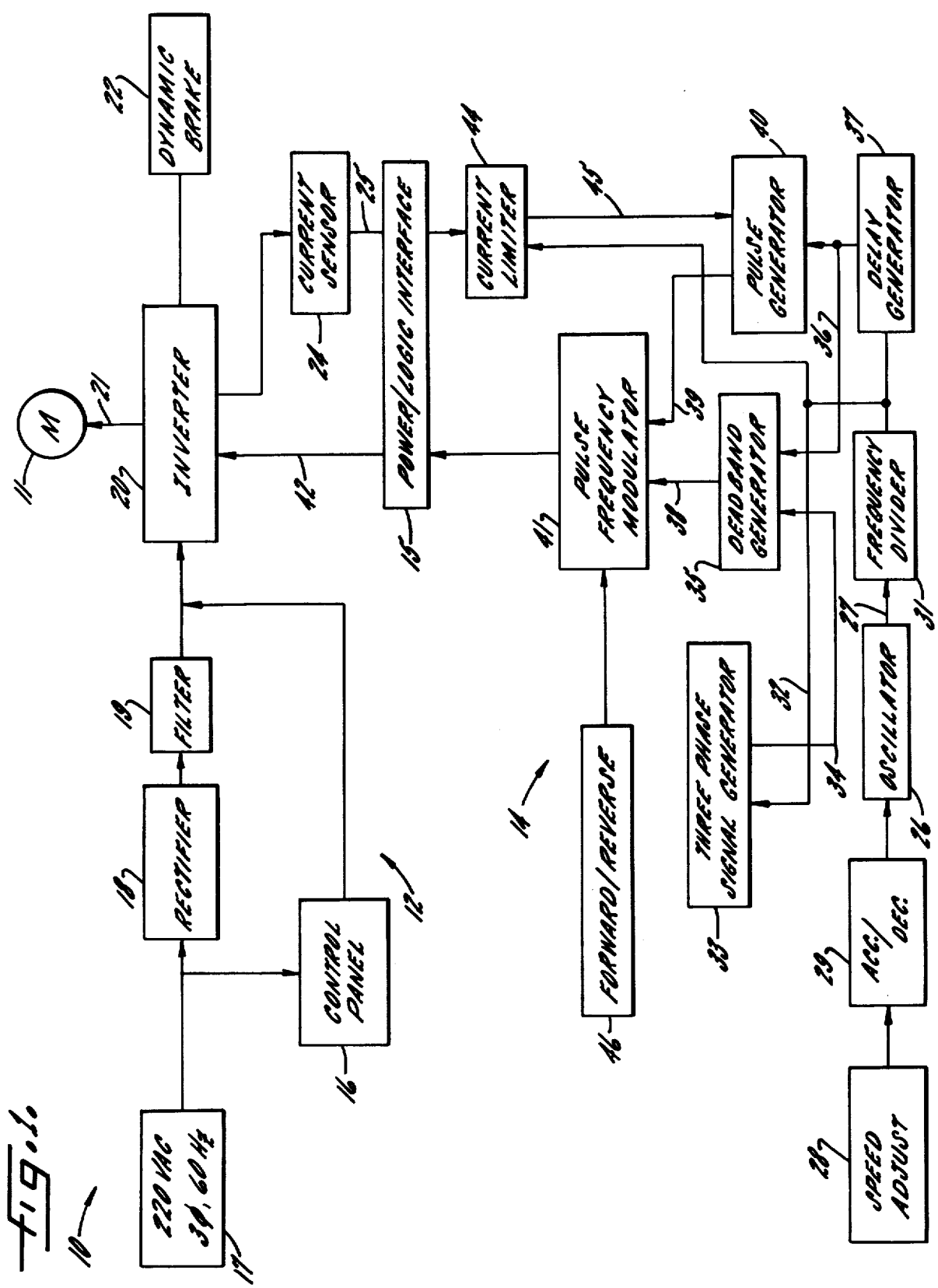
FIG. 1 is a block diagram of a voltage source variable frequency a.c. motor control system embodying the invention.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Before considering the a.c. motor control system illustrated in the drawings, it will be helpful to note the symbols and conventions which have been employed in those figures to diagrammatically represent different logic devices and signals. In this connection, the system shown in the drawings operates on a binary logic basis, i.e., each signal which is produced and responded to may have either a binary "1" or "0" value. In the present system the voltage levels corresponding to these binary valves are +5 volts and 0 volts, respectively, which is "positive" logic since the most positive logic voltage level is designated to be the logical "1" state, while the most negative logic voltage level is defined to be the logical "0" state. The system illustrated generally responds affirmatively to binary "1" signals, but when the signal has a binary "0" value, that will normally produce no response.

The term "flip-flop" is used herein to designate a device that exhibits two different stable states. The illustrative system utilizes D-type flip-flops. This device is characterized by a single data (D) input and a clock (C) input and it may have either or both Q and $\overline{Q}$ outputs available. The data input is a synchronous input, i.e., it does not cause an immediate change in the output, but rather requires the presence or occurrence of a clock pulse at the clock input to generate a change of state in the outputs. When the flip-flop is "clocked" by the occurrence of a pulse at the clock input, the binary signal present at the data input is transferred to the Q output, and the $\overline{Q}$ output is always the complement of the Q output. For example, if the data signal at the data input is a binary "1" when the flip-flop is clocked, the Q output is a binary "1" signal and the $\overline{Q}$ output is a binary "0" signal after clocking. This type of flip-flop may also have a synchronous "clear" (CR) input which is an overriding control that inhibits normal operation and causes the Q output to go to a binary "0" level when the clear input drops to logic "0".

NAND gates have been illustrated by the conventional symbol exemplified by the gate 150 in FIG. 3. As is well known, the output of the NAND gate is always a binary "1" signal except when all inputs are binary "1" signals, in which case the output becomes a binary "0" signal.

For the purposes of illustration and discussion, the system is treated as being comprised of two sub-systems — a power circuit and a logic circuit. In general, the power circuit is a high voltage, high current circuit which supplies the ultimate a.c. signal to the motor. The logic circuit is a low voltage, low current circuit which controls the operation of the power circuit.

Figure 2A:
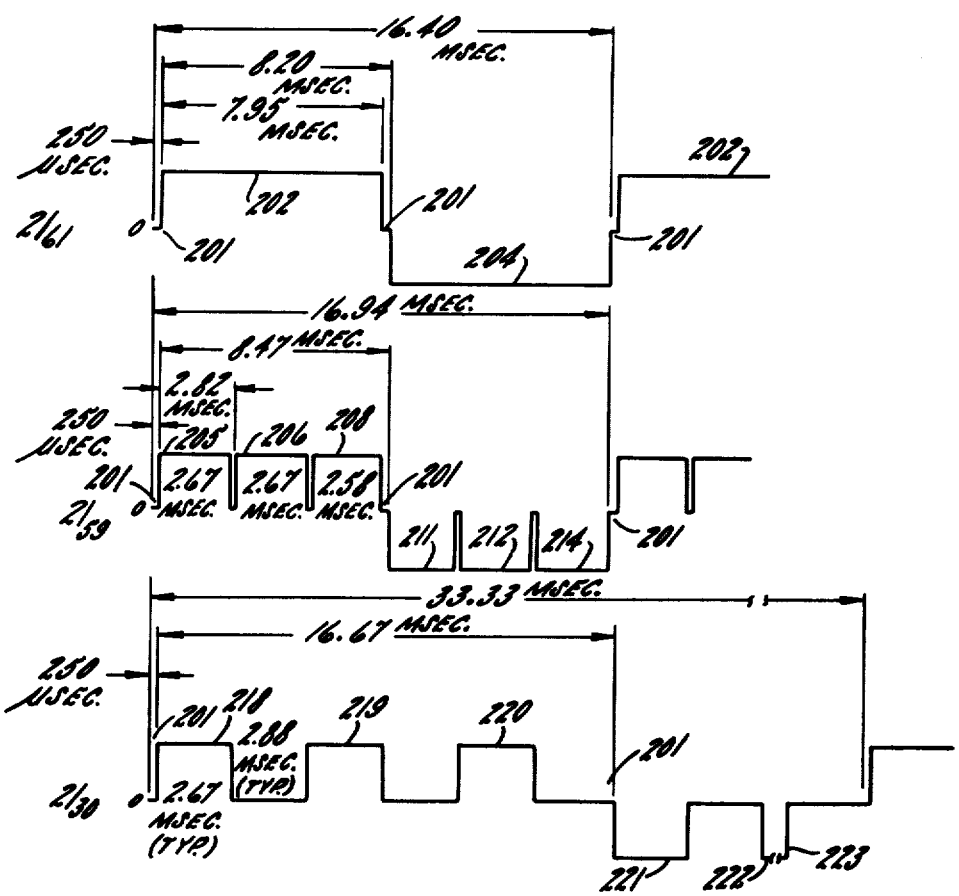
FIGS. 2a and 2b are wave form diagrams illustrating the waveforms present at several points throughout the system.
Figure 2B:
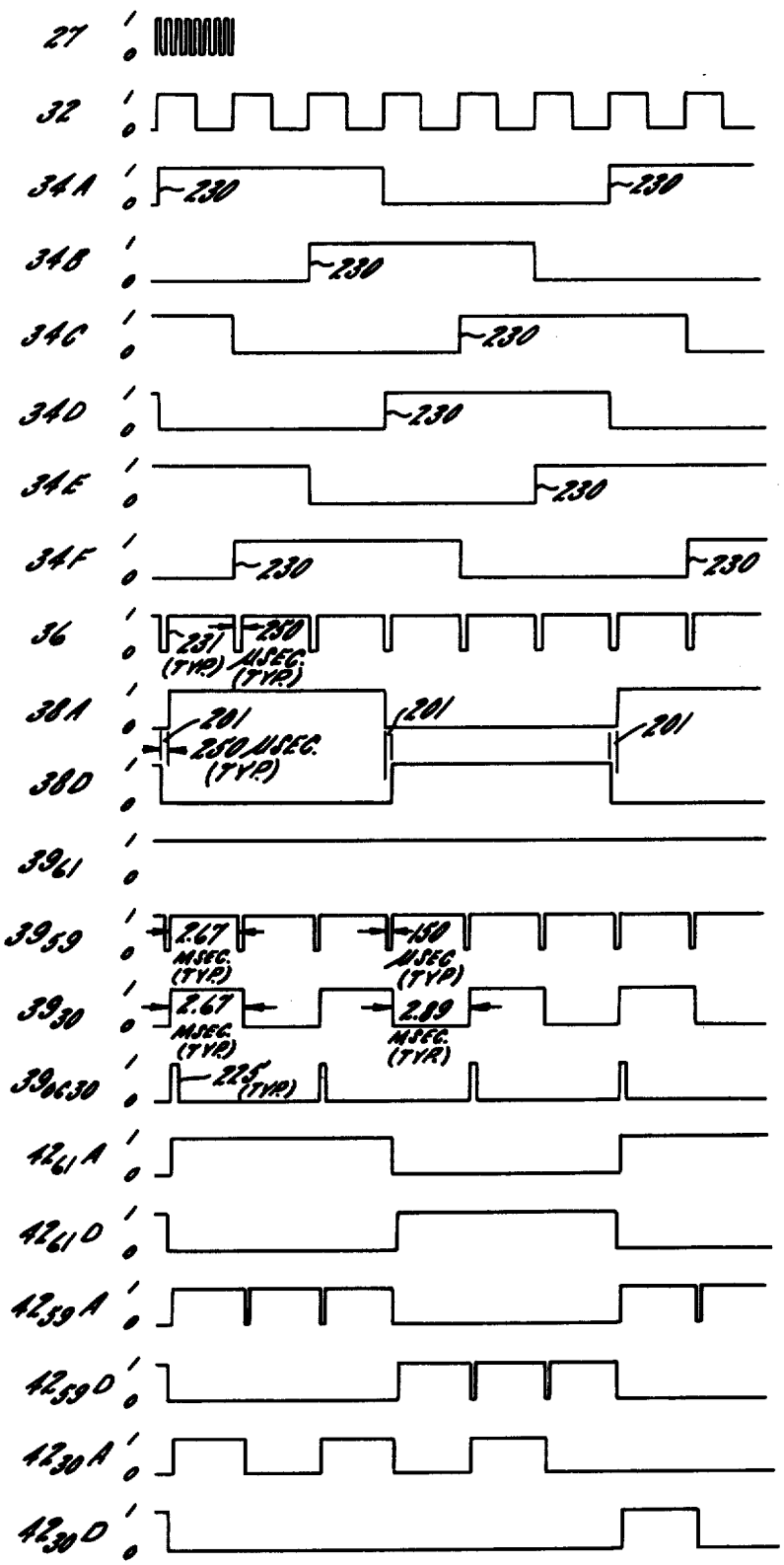

The block diagram in FIG. 1 outlines the operation of the system, with FIG. 2 illustrating the waveforms present at various points in the logic and power circuits. In illustrating the details of the circuitry in FIGS. 3 and 4, electrical components are grouped and labeled to generally correspond to the blocks labeled in FIG. 1. It should be understood that while the labels have been chosen to loosely define the functions of the designated groupings, they do not purport to completely describe all of the functional aspects. In such cases, the discussion expands the description to more completely set forth the functional significance of the component groups.

Turning now to the block diagram of FIG. 1 and the waveform diagrams of FIG. 2, a system 10 for controlling a three phase a.c. motor 11 according to the present invention is shown. The blocks are arranged to emphasize the two subsystems, namely (1) the high voltage, high current power circuit 12 and (2) the low voltage, low current logic circuit 14 and the electrically isolating power/logic interface 15.

Outlining the operation of the power circuitry 12, the operator commands to start and stop the system are registered at the control panel 16. Power for the system is derived from a supply 17, e.g., 220 volt, three phase, 60 hertz a.c., connected to the control panel 16 and to a rectifier 18. The direct current produced by the rectifier 18 is passed through a filter 19 and an inverter 20 which, as described below, contains three pairs of drivers, each driver pair cooperating to generate one phase of a three phase signal for driving the motor 11. The operation of the inverter 20 is controlled by the logic circuit 14 to perform the dual functions of (1) converting the direct current into a three phase, variable frequency, a.c. supply 21 to the motor 11 and (2) effecting pulse frequency modulation of this supply at frequencies below 60 hertz. The term "pulse frequency modulation" refers to the technique of pulsing the inverter drivers "on" and "off" at a frequency such that the resulting percentage of "on" time varies proportionally to the desired frequency of the three phase output signal. For example, at 60 hertz the percentage "on" time is nearly 100%, while at 30 hertz the corresponding percentage is about 50%. Upon integration of this pulsed voltage characteristic, the result is similar to that obtained by varying the rectifier output voltage, but the pulse frequency modulation technique has the distinct advantage of lending itself to wholly digital techniques.

To facilitate an understanding of the illustrative system, FIG. 2 illustrates one phase component of three representative motor signals generated by the system. The signal $21_{61}$ represents a 61 hertz signal generated by the system. This frequency being above 60 hertz, there is no pulse frequency modulation, the signal being substantially a square wave. The first 180° of each cycle (8.20 milliseconds) is comprised of a "deadband" period 201 (250 microseconds) during which the voltage is at 0 and a single positive excursion 202 (7.95 milliseconds). The second 180° is similar, having a deadband 201 followed by a single negative excursion 204. These "deadbands" 201 are generated by delaying the application of the positive rectifier voltage to a given stage of the inverter until a brief period after the negative rectifier voltage has been disconnected from that stage, and vice-versa. This avoids a short circuit between the positive and negative direct current output of the rectifier, which often occurs in systems which switch polarities simultaneously.

Signal $21_{59}$ represents one phase component of a 59 hertz motor signal generated by the system. At this frequency, following the deadband 201 at the beginning of a cycle, there are a series of three positive excursions 205, 206 and 208. The last half of each cycle is the mirror image of the first half, with a deadband 201 and three negative excursions 211, 212 and 213. The periods between the leading edges of each of the excursions are exactly 1/6 the period of the three phase signal (2.82 milliseconds at 59 hertz). Except for the last pulse of each polarity, i.e., pulses 208 and 214, the pulses are all 2.67 milliseconds wide. The constant period of 2.82 milliseconds between the leading edges of successive pulses and the deadband width of 250 microseconds between polarity reversals results in a pulse width of 2.58 milliseconds in the case of pulses 208 and 214.

Similarly, signal $21_{30}$ represents one phase component of a 30 hertz signal generated by the system. Following the general pattern of the 59 hertz signal described above during each three phase cycle there are three positive excursions 218, 219 and 220 and three negative excursions 221, 222 and 223, each having a 2.67 millisecond duration with the leading edges of successive pulses separated by 1/6 the period of the three phase cycle (5.55 milliseconds at 30 hertz). The deadbands 201 are "buried" in the periods of "0" voltage between the excursions at all frequencies under about 57 hertz, at which point the "0" periods between the 2.67 millisecond pulses begin to exceed the deadband width of 250 microseconds.

The critical difference between the three signals $21_{61}$, $21_{59}$ and $21_{30}$ lies in the percentage of time during which the signals are at the positive or negative rectifier voltage. In the case of signal $21_{61}$, exc ept during the deadbands 201, the signal is always at either a positive or negative rectifier voltage. This amounts to 97% of the time. In the case of the signal $21_{59}$, the percentage of time during which the phase signal is at either the positive or negative d.c. voltage is 94%. In the case of signal $21_{30}$, the percentage is 48%. From the foregoing it can be appreciated that between a signal frequency of 60 hertz and the recommended maximum motor signal frequency of 120 hertz the percentage "on" time is very high and substantially constant, ranging between about 97 and 94%. On the other hand, between a signal frequency of 60 hertz and the recommended minimum frequency of 10 hertz, the percentage "on" time varies substantially linearly with the frequency, ranging from 94% at 59 hertz to 48% at 30 hertz to 16% at 10 hertz. That is, the interval during which current is supplied to the motor in each cycle varies with frequency above 60 hertz, but below 60 hertz the interval during which current is supplied to the motor remains constant regardless of the frequency. In this manner the system operates in a constant horsepower mode above 60 hertz and a constant torque (constant current) mode below 60 hertz in accordance with the operating characteristics of conventional a.c. motors.

In order to avoid the application of excess voltages to the motor in the event of surges in the rectifier output or, more commonly, during deceleration when the motor is regenerating, a dynamic brake 22 monitors the voltage differential in the inverter and serves to limit the voltage to a predetermined maximum. Finally, a current sensor 24 monitors the current in the inverter 20, providing a signal 25 through the power/logic interface 15 into a current limiter 44 in the logic circuit 14 whenever the monitored current exceeds a predetermined maximum.

Outlining the operation of the logic circuitry 14, a voltage controlled oscillator 26 generates a timing signal 27 from which the subsequent logic signals are derived. See FIG. 2 for oscillator signal 27 and the subsequent waveforms. A speed adjust 28 and accelerator/decelerator 29 regulate the frequency and rate of change of the oscillator signal 27 for controlling the motor speed and its acceleration and deceleration rates. The oscillator output is divided for stability by a divider 31, and the divider output 32 is used to generate two reciprocal three phase signals 34 in a three phase signal generator 33. The frequency of the three phase signal 34 is 1/6 that of the divider output 32.

As illustrated in FIG. 2, one of the three phase signals 34 comprises components 34A, 34B and 34C having 120° between phases, and the other three phase signal comprises components 34D, 34E and 34F with component 34D being the reciprocal of component 34F, component 34E being the reciprocal of component 34B, and component 34F being the reciprocal of component 34F. As ultimately refined, infra, each of these six components serves to control a separate driver in the inverter 20, with reciprocal components (e.g. 34A and 34D) controlling a driver pair for generating one phase of the final a.c. output.

To prevent the two drivers in any given pair from being on at the same time, deadbands 201 are incorporated into each of the signals 34A-F by a deadband generator 35 through combination of the signals 34A-F with a signal 36 from a delay generator 37. The resulting six component output signal 38 has deadbands 201 between the logic "1"-to-logic "0" changes of state of the three components corresponding to the inputs 34A-C, and between the logic "0"-to-logic "1" changes of state of the reciprocal components corresponding to inputs 34D-F. FIG. 2 illustrates these deadbands between the changes of state of reciprocal components 38A and 38D. The signal 38 is then pulse frequency modulated through combination with the output 39 of a pulse generator 40 in a pulse frequency modulator 41.

Referring again to FIG. 2, the waveforms $39_{61}$, $39_{59}$ and $39_{30}$ illustrate the signal 39 from the pulse generator 40 at frequencies corresponding to three phase frequencies of 61 hertz, 59 hertz and 30 hertz, respectively. The actual frequencies of the signals $39_{61}$, $39_{59}$ and $39_{30}$ are 366 hertz, 354 hertz and 180 hertz, respectively. In waveform $39_{61}$ there are no pulses, the signal being at the logic "1" level continuously. In waveform $39_{59}$, there are pulses of 2.67-millisecond duration each separated by logic "0" periods of 150 microsecond duration each. While the pulses in waveform $39_{30}$ are also 2.67 milliseconds wide, the reduced frequency results in intervening logic "0" periods of 2.88 millisecond each. The output of the pulse frequency modulator 41 comprises two reciprocal three phase, variable frequency, pulse frequency modulated signals 42 A-C and 42D-F. FIG. 2 illustrates two reciprocal components 42A and 42D at the frequencies of 61 hertz, 59 hertz and 30 hertz. The complete signal 42A-F passes through the logic/power interface 15 to control the drivers within the inverter 20. It will be recognized that using the A components to control the application of the positive rectifier voltage to one phase while using the D components to control the application of the negative rectifier voltage to the same phase will result in the waveforms $21_{61}$, $21_{59}$ and $21_{30}$, as will be discussed in more detail below.

Still referring to the logic circuitry 14, in the event of excessive current in the inverter 20, a current limiter 44 responds to the aforementioned signal 25 from the current sensor 24 by supplying a signal 45 to the pulse generator 40, shutting off all drivers within the inverter and thereafter disabling them during substantially all of their normally on state until the overcurrent is no longer sensed. Waveform $39_{OC30}$ represents the pulse generator output during an overcurrent situation at 30 hertz. Comparing this waveform to the normal waveform at 30 hertz, $39_{30}$, it can be seen that the logic "1" excursions are reduced to "spikes" 225 as will be explained below.

To control the direction of the motor 11, a forward/reverse circuit 46 serves to control the phase sequence of the signal 42, thereby determining the direction of rotation of motor 11.

Having outlined the operation of the illustrative system, the power and logic circuits 12 and 14 will now be described in more detail. Turning first to the power circuit 12 as illustrative in FIG. 3, the 220-volt, three-phase, 60 hertz supply 17 is converted to direct current by a conventional rectifier 18. The application of the resulting direct current to the inverter 20 is controlled by normally open contacts 51 and 52, the operation of which is controlled by a relay 53 in the control panel circuit 16. A filter 19 serves to filter out voltage spikes and slow other rapid changes in the output of rectifier 18.

The control panel circuit 16 serves to transform the operator commands of "start", "stop" and "jog" into electrical signals which accomplish these functions. In addition, the circuit gives a visible indication of the operating mode, whether it be "standby" or "run". Lines 54 and 55 connect the control panel circuit 16 across two phases of the supply 17. A "standby" lamp 57 is lighted as long as supply 17 is present, the motor 11 is at rest, and a normally closed, manually operable "stop" switch 65 is closed. To start the motor 11 in a continuous running mode, a "start" switch 56 is momentarily closed. The closing of this switch 56 energizes a relay 59 to close two pairs of normally open contacts 61 and 62 while opening a pair of normally closed contacts 64 (see FIG. 4). The closing of the contacts 61 locks in the relay 59 so that it remains energized when the "start" switch is released and returns to its open position. The relay 59 then remains energized until a momentary depression of the "stop" switch opens the circuit. The closing of contacts 62 energizes the "run" light 60 and a relay 53, which in turn closes the normally open contacts 51, 52 and 67. The closing of contacts 51 and 52 connects the rectifier 18 and filter 19 to the positive and negative busses, 81 and 82, respectively. The closing of contacts 67 locks in the relay 53 until the "stop" switch 65 opens the circuit. The opening of contacts 64 enables to acceleration/deceleration circuit 29, as will be described in more detail below.

Figure 4:
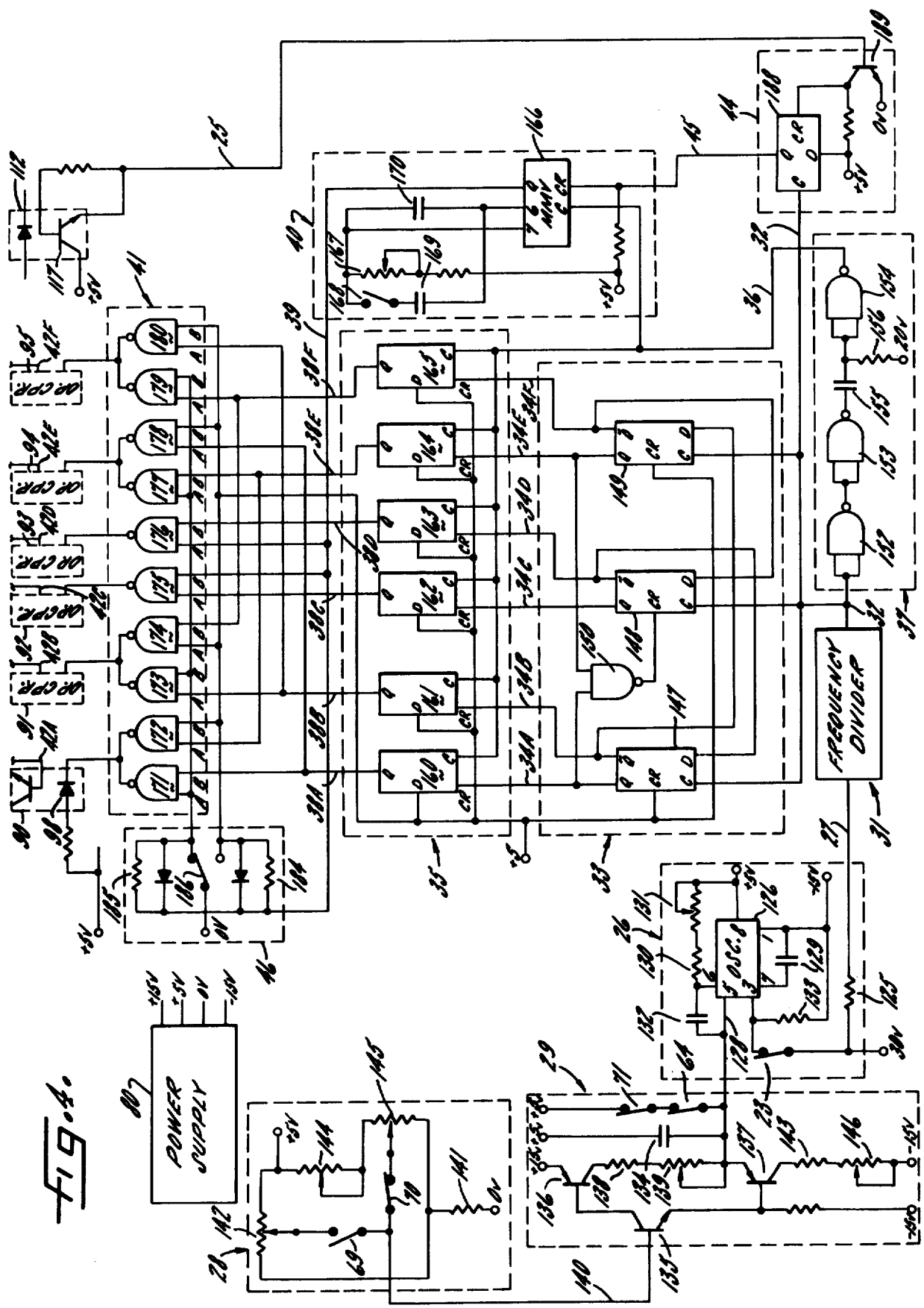
FIG. 4 is a more detailed block and circuit diagram of the logic circuitry of the system illustrated in FIG. 1.

To start the motor in a "jog" switch 58 is momentarily closed to energize a relay 66 which closes two pairs of normally open contacts 68 and 69 (see FIG. 4 for contacts 69) and opens two pairs or normally closed contacts 70 and 71 (see FIG. 4). The closing of contacts 68 energizes the "run" light 60 and the relay 53, thereby closing contacts 51, 52 and 67 to supply power to the busses 81 and 82 and lock in the relay 53. The closing of contacts 69 in conjunction with the opening of contacts 70 disables the speed adjust circuit 28, while opening of the contacts 71 enables the acceleration/deceleration circuit 29. Both the speed adjust circuit 28 and the accelerator/decelerator circuit 29 will be described in more detail below. With no latching feature in the "jog" circuit, however, the release of the "jog" switch 58 de-energizes the relay 66, allowing the contacts 68, 69, 70 and 71 to return to their normal states and de-energizing the motor.

Whenever the contacts 51 and 52 are closed in response to closing of either the "start" switch 56 or "Jog" switch 58, power is supplied to the inverter 20 comprising six drivers 84–89. These drivers are arranged in three series — connected pairs, namely pairs 84 and 85, 86 and 87, and 88 and 89, which are connected in parallel with each other across the busses 81 and 82. The outputs of these three driver pairs comprise the three phase supply 21 to the motor 11. "Free-wheeling" diodes 83 are connected across each driver in the conventional manner.

The drivers 84–89 are all identical to each other. each being a conventional transistorized unit which is "off" except upon the application of a positive voltage differential between the base (B) and emitter (E) terminals. The switching of the drivers 84–89 is controlled by signals from six optical couplers 90–95 which comprise a part of the power/logic interface 15. For simplicity, the circuitry of only one of the optical couplers, namely coupler 90, and the associate power supply 96 and interconnections therebetween and with driver 84 are illustrated. It should be understood that the circuitry, power supply and interconnections are identical for each of the other five optical couplers 91–95 and their associated drivers 85–89, respectively.

Referring to the exemplary circuitry shown in connection with the optical coupler associated with driver 84, a phototransistor 97 within the coupler 90 is arranged to be turned "on" upon the emission of light from a light emitting diode 98, the operation of which is discussed below in connection with the detailed description of the logic circuitry 14. The saturation of phototransistor 97 turns "on" another transistor 99 which connects the d.c. power supply 96 across the base (B) and emitter (E) terminals of the driver 84, thereby turning "on" the driver. With the driver 84 "on", the voltage of the positive buss 81 is supplied through the emitter-collector circuit of the driver 84 and an output line 100 to one phase of motor 11. Similarly, when driver 85 is turned "on" by its associated optical coupler 91, the circuit between the negative buss 82 and line 100 is completed. In like fashion, drivers 86 and 87 cooperate with optical couplers 92 and 93 to complete the circuit between the inverter busses and a second output line 101, and drivers 88 and 89 cooperate with optical couplers 94 and 95 to complete the circuit between the busses and a third output line 102. Thus, the output signals generated on the three output lines 100–102 comprise the three phases of the drive signal for the motor 11.

It will be appreciated that a short circuit between the positive and negative busses 81 and 82 will occur if both drivers of any given pair are "on" at the same time. As will be discussed in more detail below in connection with the logic circuitry 14, the sequence in which the drivers are switched prevents this occurrence. To further protect the inverter from overcurrent, a current sensor 24 is provided to sense excessive current in the negative buss 82. To do so, the voltage drop across a resistor 105 in the negative buss 82 is amplified by an operational amplifier 106 (e.g., Texas Instruments S/N 72741). The amplified voltage is then applied across the series connection of resistor 109, silicon bi-directional switch 110 and the light emitting diode 111 of an optical coupler 112. Should the voltage across the silicon bi-directional switch 110 exceed its breakover voltage, current will pass through light emitting diode 111, causing the phototransistor 117 within the optical coupler to become saturated. The effect of this occurrence is explained in detail in connection with the discussion of the logic circuit 14 below.

One other subcircuit in the power circuit 12 serves to protect the system. Dynamic brake circuit 22 limits the voltage differential between the positive buss 81 and the negative buss 82 by allowing current to pass through a power resistor network 124 when a transistorized driver 122 (similar to drivers 84–89) is "on". Describing the control of driver 122, a fixed resistor 113, a variable resistor 114 and a capacitor 117 are connected in series between the positive buss 81 and the negative buss 82. The wiper of the variable resistor 114 is connected through a Zenor diode 116 and a resistor 118 to the input of a Schmitt trigger 119. A constant voltage between the Schmitt trigger 119 and the negative buss 82 is fixed by a power supply 115 connected therebetween. The output of the Schmitt trigger is connected through a resistor 120 and diode 123 to the base of a transistor 121. It will be appreciated that so long as the voltage differential between the positive and negative busses 81 and 82 lies within a range determined by the wiper position of variable resistor 114 and the characteristics of the Schmitt trigger, the driver 122 will be "off", interrupting the circuit between the busses through power resistor network 124. When the voltage differential between the busses exceeds the upper limit of this range, however, the Schmitt trigger will turn "on" transistor 121, turning "on" driver 122, and thereby completing the circuit through resistor network 124 to protect the drivers 84–89. For example, when all the drivers 84–89 are "off" and the motor 11 is producing a regenerative voltage across the busses 81 and 82 via diodes 83, the driver 122 is turned on to dissipate current through the resistor network 124 and thereby protect the drivers 84–89 from this transient excessive voltage.

Turning now to FIG. 4 for a more detailed description of the operation of logic circuitry 14 which controls the switching of the six drivers 84–89, a d.c. power supply 80 supplies the outputs of +15v, +5v (logic "1"), 0v (logic "0") and −15v required by the various components. The interconnecting lines between the power supply 80 and the various components are not shown in order to simplify the drawing and the associated description. Instead, voltage levels are indicated at various terminals throughout the circuit. Further, the +5v and 0v inputs to most integrated circuits and NAND gates are omitted.

With the switch 23 in the position shown, the timing signal 27 for the logic circuit 14 is provided by a voltage controlled oscillator 26. The timing signal may also be supplied from an external source, e.g. a computer, by moving switch 23 to its alternative position and connecting the external signal to terminal 30. Resistor 125 serves to limit current to the frequency divider 31.

The oscillator 26 is comprised of an integrated circuit 126 (e.g. Signetics S/N 566) and associated resistors and capacitors 129–133. To accommodate a pin 5 input voltage ranging from 0 to +5 volts, the "ground" pin 1 of the integrated circuit 126 is maintained at −15v instead of the normal "ground" state of 0v. The logic "1" level is set at +5v through connection of the corresponding output of the power supply 80 to pin 8. In accordance with the characteristics of the integrated circuit, the relationship between the voltage level of the input 128 at pin 5 and the frequency of the square wave output at pin 3 is a function of (1) the value of capacitor 129 connected between pins 7 and 1 and (2) the value of fixed resistor 130 and the value and setting of variable resistor 131, connected in series between pins 6 and 8. Capacitor 132 is connected between pins 5 and 6 to eliminate possible oscillation in the control current source. A resistor 133, connected between the oscillator square wave output at pin 3 and the ground pin 1, serves as a load resistor. With the arrangement shown and described, as the voltage level of the oscillator input 128 varies between +5 and 0 volts, the frequency of the oscillator square wave output 27 varies between about 600 hertz and 7200 hertz in proportion to variations in the input voltage.

The accelerator/decelerator subcircuit 29 serves to control the rates of increase and decrease of the voltage level applied to the oscillator input 128. This circuit consists essentially of two R circuits, with a portion of the charging curve of one RC circuit serving as the deceleration curve for the system and a portion of the discharging curve of the other RC circuit serving as the acceleration curve for the system. To this end, a capacitor 134 is connected between +5v and the input 128 of oscillator 26. The opening of normally closed contacts 64 or 71 through the energization of relays 59 or 66, respectively, enables the accelerator/decelerator circuit by permitting the voltage level at the oscillator input 28 to increase or decrease, as necessary, to the voltage level at the accelerator/decelerator input 140 at a rate dependent upon the characteristics of the circuit.

With either contacts 64 or 71 open and with the voltage at the accelerator/decelerator input 140 between 0v and +5v and at a higher level than the voltage at oscillator input 128, and, thus, calling for deceleration to a lower oscillator frequency the transistor 135 is "on", turning on the transistor 136. The transistor 137 is reverse-biased and, therefore, "off". This allows the +15v connected to the collector of transistor 136 to charge into a capacitor 134 through a fixed resistor 138 and a variable resistor 139 until the voltage level at oscillator input 138 rises to the voltage level present at 140. At this point the transistor 135 switches "off". The cessation of current through the base of transistor 136 turns that transistor "off", opening the RC circuit through resistors 138 and 139 such that the voltage at oscillator input 128 is maintained at the level present at accelerator/decelerator input 140.

On the other hand, with the accelerator/decelerator circuit enabled and the voltage at 140 between 0v and +5v but at a level lower than that at oscillator input 128, calling for acceleration to a higher oscillator frequency, transistor 137 is "on", reverse-biasing transistor 135 such that it is "off". With no current through the base of transistor 136, it is "off", opening the RC charging circuit through resistors 138 and 139. With transistor 137 "on", a discharge path through a fixed resistor 143 and a variable resistor 146 is established.

Figure 5:
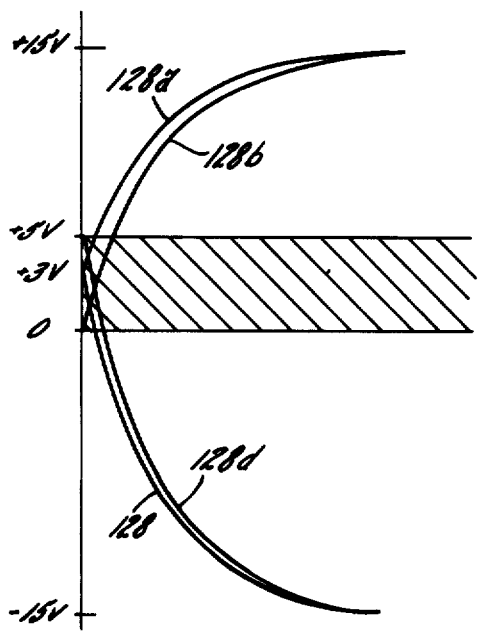
FIG. 5 is a wave form diagram of the output of one portion of the circuitry of FIG. 4.

For the purpose of illustrating the rates of acceleration and deceleration achieved by the circuit 29 described above, FIG. 5 contains four graphs of the voltage level at input 128 to the oscillator 126 for a period following a change in the voltage at accelerator/decelerator input 140. As explained above, the frequency of the oscillator output 27 varies, with the input voltage with the frequency ranging from about 600 hertz with a +5v oscillator input 128 to about 7200 hertz with a 0v oscillator input. Curve 128 a represents the voltage level at oscillator input 128 for the period following a change in the voltage accelerator/decelerator input 140 from +3v to +5 volts, corresponding to a command to decelerate the oscillator from about 3240 hertz to 600 hertz. The whole curve 128 a represents the logarithmic path the voltage level would trace if transistor 135 did not serve to stop the changing of capacitor 134 when the voltage level at 128 reaches the voltage level at 140, i.e. +5v in the present example. By way of further example, curve 128 b represents to path of the voltage level oscillator input at 128 for the period after a change in the voltage level at accelerator/decelerator input 140 from 0v to +5v, corresponding to a command to decelerate from about 7200 hertz to 600 hertz. Similarly, acceleration from about 600 hertz (+5V) to about 7200 hertz (0V) is represented by curve 128 c, while curve 128 represents acceleration from about 3240 hertz to about 7200 hertz. As can be appreciated by utilizing only the portions of the logarithmic acceleration/deceleration curves lying within the crosshatched area 128 e, nearly linear characteristics are achieved using an RC circuit and inexpensive switching transistors.

While the accelerator/decelerator circuit 29 controls the rate of change of the voltage level of the oscillator input 128, the speed adjust circuit 28 determines the steady state magnitude of that input. As explained above, the steady state voltage at the oscillator input 128 equals the voltage applied at the accelerator/decelerator input 140. The voltage level applied to the accelerator/decelerator input 140 depends upon which set of contacts, 69 or 70, are closed in the speed adjust circuit 28. As explained above in connection with the description of the control panel 16, the relay 66 which operates the contacts 69 and 70 is energized when the "jog" switch (not shown) is closed. While the "jog" switch is closed, the contacts 69 are closed and the contacts 70 are open. In such case, the voltage level at the accelerator/decelerator input 140 depends upon the value of the resistor 141 and the value and wiper position of the variable resistor 142. When the "jog" switch is open, contacts 69 are open and contacts 70 are closed, with the voltage at accelerator/decelerator input 140 depending upon the value of the resistor 141 and the values and wiper positions of the variable resistors 144 and 145. In the arrangement shown, the variable resistor 144 may be used to set the maximum voltage level which may be applied to the accelerator/decelerator input 140, thereby setting the minimum oscillator frequency. The second variable resistor 145 may then be used to adjust the oscillator frequency between the minimum as determined by the setting of the variable resistor 144 and the maximum as determined by the setting of the variable resistor 131.

For the purpose of stabilizing the oscillator output 27, a conventional frequency divider 31 converts the oscillator output to a square wave output 32 having a frequency one tenth that of the oscillator output.

To form a three phase signal for driving the motor 11, the divider output 32 is fed to a three phase signal generator 33, comprising three D flip-flops 147, 148, and 149. The D, Q and $\overline{Q}$ terminals of these three flip-flops are interconnected in a well known manner to convert the square wave from the divider 31 into three similar square waves which are out of phase from each other by 120°. Thus, these three square waves, generated at the Q outputs of the flip-flops 147-149, form a three-phase signal. See wave forms 34A, 34B and 34C illustrated in FIG. 2. The reciprocals of these three square waves are generated at the $\overline{Q}$ outputs of the same flip-flops. See waveforms 34D, 34E and 34F. To ensure that only two Q outputs of the three flip-flops can be at logic level "1" when the logic circuitry is turned on, a NAND gate 150 receives its inputs from the Q outputs of flip-flops 147 and 149 and has its output connected to the CR input of the flip-flop 148. This causes the Q output of flip-flop 148 to be driven to a "0" logic level by a "0" logic level CR input in the event the Q ouputs of flip-flops 147 and 149 are both at logic level "1".

In accordance with an important aspect of the present invention, the two three phase reciprocal signals comprising signal 34 are next refined to include predetermined delays or "deadbands" between the changes of state in the reciprocal Q and $\overline{Q}$ outputs of the flip-flops 147, 148 and 149. As will be hereinafter made clear, this delay serves to assure that one driver of each driver pair in the inverter 20 (see description above) is "off" before the other is "on", thereby preventing a short circuit between the positive buss 81 and the negative buss 82.

To generate the required delays between the changes of state in the reciprocal outputs of the three phase signal generator 33, the divider output 32 is connected to a delay generator 37. This circuit is comprised of a series of three NAND gates 152, 153 and 154. Gates 152 and 153 serve as a buffer between the frequency divider 31 and a delay network comprising a capacitor 155 and a resistor 156. The capacitor 155 is interposed between the output of gate 153 and the inputs of gate 154, while the resistor 156 connected between the input of gate 154 and 0v. This arrangement results in an output 36 which remains at the logic level "1" except for a logic level "0" excursion, triggered by each logic "0"-to-logic "1" change of state in the divider output 32, of a duration determined by the values of capacitor 155 and resistor 156. In the embodiment shown, the logic level "0" excursion is 250 microseconds. See waveform 66 of FIG. 2.

In order to incorporate the 250 microsecond delay in signal 36 into the three phase output 34 of the three phase signal generator 33, both the output 34 and the delay generator output 36 are fed into a deadband generator 35 comprising six D flip-flops 160, 161, 162, 163, 164 and 165. Each of the six outputs 34A-34F from the generator 33 is connected to the clear (CR) input of one of the flip-flops 160-165, while the signal 36 is applied to the clock (C) inputs of all six of the flip-flops 160-165. The data input (D) of each of the flip-flops is connected to +5v (logic level "1"). Through this arrangement the flip-flops 160-165 are all enabled by logic "0"-to-logic "1" changes of state 230 in the respective signals 34A to 34F. In accordance with the operating characteristics of the flip-flops the Q output switch to logic "1" upon receipt of the next logic "0"-to-logic "1" change of state 231 in the signal 36, which, as explained above, trails the logic "0"-to-logic "1" changes of state 230 by about 250 microseconds. As illustrated by waveforms 38A and 38D in FIG. 2, the result is a 250-microsecond "deadband" 201 between reciprocal changes in state.

Having generated a three phase "framework" with deadbands 201 according to the present invention, the next step is to modulate the signal 38 at frequencies below 60 hertz with variable frequency pulses from a pulse generator 40. This circuit comprises a monostable multivibrator (MMV) 166 (e.g. Signetics S/N 74123) which, upon receipt of a "0"-to-"1" change of state at clock input C switches the Q output from "0" to "1" for a predetermined period "t". If the Q output is already at "1", it is retriggered for the same period "t". In either event, if a subsequent "0"-to-"1" change of state at input C does not occur within the period "t", the Q output automatically switches to logic "0" at the end of the period "t". The width of the pulses generated by the MMV 166 is controlled by an RC network connected across pins 6 and 7 of the MMV. This RC network includes a capacitor 170 and a variable resistor 167 for adjusting the width of the pulses generated at the Q output of the MMV.

As has already been explained, conventional a.c. motors run in a constant torque (constant current) mode at frequencies below about 60 hertz. Above about 60 hertz the motor is designed to run in a constant horsepower mode. Hence, it is desirable to modulate the three phase motor signal only at frequencies below 60 hertz. Since the frequency of the delay generator output 36 is six times the frequency of the three phase output 38 of the generator 35 (as a result of the divide-by-six effect of the three phase signal generator 33), the MMV pulse width should be slightly less than one sixth the period of a 60 hertz signal, i.e., 1/6 of 16.67 milliseconds or 2.78 milliseconds. Thus, setting variable resistor 167 to produce a 2.67 a millisecond pulse yields the waveforms $39_{61}$, $39_{59}$ and $39_{30}$, corresponding to input motor signal frequencies of 61 hertz, 59 hertz and 30 hertz, respectively.

In the embodiment shown, an option is available to operate in a constant horsepower mode at all frequencies. This option may be used either when motor overheating is not a problem at frequencies below 60 hertz or when auxiliary motor cooling means (not shown) are employed. By moving a switch 168 from the position shown to its alternative position, a capacitor 169 is connected in parallel with the capacitor 170. As a result, the capacitance of the circuit is increased, which according to the operating characteristics of the MMV, lengthens the pulse width. By choosing the value of the capacitor 169 to increase the pulse width of avalue in excess of the expected period of MMV input signal 32 (16.67 milliseconds at the recommended minimum three phase frequency of 10 hertz), the MMV Q output 39 will remain continuously at logic "1" as in waveform $39_{61}$ eliminating any pulsing.

The next operation is to use the output of the pulse generator 40 to modulate the six signals 38A-F from the deadband generator 35. This is accomplished in the pulse frequency modulator 41, which operates in conjunction with the forward/reverse circuit 46 to also control the motor direction.

The pulse frequency modulator 41 comprises ten NAND gates 171-180 whose inputs are connected to the generators 35 and 40 in such a manner that the six outputs 38A-38F of the generator 35 are modulated by the output 39 of the generator 40. The resulting six modulated signals 42A-42F are applied to the six optical couplers 90-95 in either of two different sequences which control the motor direction. More specifically, the modulated signals are applied to the optical couplers in the sequence 90, 92, 94 and 91, 93, 95 to drive the motor in one direction, and in the sequence 94, 92, 90 and 95, 93, 91 to drive the motor in the other direction. The sequence reversal is achieved by interchanging the signals to optical couplers 90 and 94 as well as the signals to optical couplers 91 and 95, while maintaining the same signals to optical couplers 92 and 93 in both sequences. The interchanging of signals to the optical couplers 90, 94 and 91, 95 is accomplished through the selective use of one of two NAND gate outputs as the input ot each optical coupler which is switched to reverse the sequence, i.e., optical couplers 90, 91, 94 and 95. With the system operating in one phase sequence, one of the two gates is active, the other being inactive. With the system operating in the reverse sequence, the states of the gates are reversed. In the arrangement shown a NAND gate is inactive whenever its output is "1". This is made clear by referring to the details of optical coupler 90. It should be understood that although the details of only optical coupler 90 are illustrated, all six optical couplers 90-95 are the same. The anode of light emitting diode 98 is at +5v. Current will pass through the diode causing it to emit light, turn on phototransistor 96 (supra) and ultimately apply the voltage of positive buss 81 to line 100 of the motor, only when the cathode of the light emitting diode is at 0v (logical "0"). The NAND gate outputs are at logical "0" only when both inputs are at logical "1". Accordingly, a gate may be rendered inactive by applying a logical "0" signal to either input. Switch 186 in the forward/reverse circuit 46 is used to selectively ground the A input of gates 171, 173, 177 and 180 when in the position shown and the A input of gates 172, 174, 178 and 180 when the switch is in its alternative position.

The outputs signal 39 from the pulse generator 40 is supplied the A inputs of gates 175 and 176 and also to the A inputs of the four gates (171, 173, 177 and 178 or 172, 174, 178 and 180) which are not grounded by the switch 86. As shown in the drawings, signal 39 is applied directly in the case of gates 175 and 176; through resistor 184 in the case of gates 171, 173, 177 and 179; and through resistor 185 in the case of gates 172, 174, 178 and 180. To the B input of the six active gates is connected one each of signal 38A-38F. Signals 38C and 38D are connected directly to the B inputs of gates 715 and 176, the outputs of which, as explained above, are connected directly to optical couplers 92 and 93. Signals 39A, 39B, 39E and 39F are connected to the B input of two gates each. Specifically, signal 39A is connected to an input of gates 171 and 178; signal 39B to gates 173 and 180; signal 39E to gates 172 and 177; and signal 39F to gates 174 and 179. As explained above, only one of the two gates to which a signal is connected is active. During operation, therefore, the six signals 38A-38F are each connected to the B input of one active NAND gate, with signal 39 being connected to the A input of each of the six active NAND gates. The outputs of the gates are at logical "0" when both the A an B inputs are at logic "1". Referring to FIG. 2, waveforms $42_{61}$ A and $42_{61}$ D represent the outputs of optical couplers 90 and 93 at a three phase frequency of 61 hertz. Similary, waveforms $42_{59}$ A and $42_{59}$ D represent the outputs at 59 hertz, with waveforms $42_{30}$A and $42_{30}$D representing the outputs at 30 hertz.

It will be appreciated that these pairs of signals will control drivers 84 and 85 to generate in line 100 the waveforms $21_{61}$, $21_{59}$ and $21_{30}$, respectively. The other two phases in line 101 and 102 will be identical, separated from the exemplary phase in line 100 and one another by 120°.

As a final point in describing the details and operation of logic circuit 14, current limiter circuit 44 serves to protect the inverter 20 by turning "off" all drivers in response to a logical "1" signal 25 from optical coupler 112, the operation of which is discussed above in connection with the operation of current sensor 25.

The current limiter current 44 is comprised of a D flip-flop 188 to the clock (C) input of which is connected divider signal 32. A transistor 189 serves to ground the clear (CR) input whenever the signal 25 is at logical "1", indicating an overcurrent. This results in the Q output 45 being driven to logic "0", in turn driving the output 39 of MMV 166 to logic "0". It will be appreciated that none of the ten gates 171-180 can have a logical "0" output as long as the output 39 remains at logical "0". Hence, all photocouplers 90-95 are "off" with the result that all drivers 84-89 are also "off", eliminating the overcurrent and allowing signal 25 to drop to logical "0". This turns "off" transistor 189 and returns flip-flop 188 to normal operation. Upon receipt of the next logical "0"-to-logical "1" change of state in signal 32, the Q output 45 will switch to logical "1", returning MMV 166 to normal operation. If an overcurrent is again sensed by current sensor 24, the above-described sequence of operation will be repeated. Waveform $39_{OC30}$ illustrates the MMV output 39 with the frequency set at 30 hertz and with the system in an overcurrent situation, as would occur in the case of a short between phases or in the event of a driver failure which shorts the busses. It will be appreciated that the "spikes" 225 in the waveform $39_{OC30}$ are of very short duration as a result of the system design.

Referring to FIG. 3, filter 19 prevents an instantaneous increase in the supply current. By monitoring the amplitude of the current instead of the duration of an overcurrent as is done in many known systems, the system responds at digital circuitry speed to shut "off" all drivers. Accordingly, the components need not have the overcapacity required in known systems.

What is claimed is:

1. A system for generating a three phase variable frequency signal for driving a three phase a.c. motor, said system comprising the combination of a d.c. voltage source having positive and negative voltage levels, an inverter having a plurality of controllable solid state switching means for selectively applying said positive and negative voltage levels alternately to each of three output lines to generate a three phase a.c. output, means for controlling the rise times of the positive and negative currents flowing to the inverter, current sensing means for generating a control signal in response to an increase in the magnitude of the inverter current flow through said inverter above a predetermined level, and current limiting means responsive to said control signal for limiting the inverter current flow to said predetermined level, said current sensing means comprising a resistor between said d.c. voltage source and the inverter, the voltage drop across said resistor being proportional to the current therethrough, an amplifier for amplifying the magnitude of the voltage drop across said resistor, and a silicon bidirectional switch which generates a control signal when said amplified resistor voltage drop exceeds a predetermined level.

2. A system for generating a three phase variable frequency signal for driving a three phase a.c. motor, said system comprising the combination of a d.c. voltage source having positive and negative voltage levels, an inverter having a plurality of controllable solid state switching means for selectively applying said positive and negative voltage levels alternately to each of three output lines to generate a three phase a.c. output, and dynamic braking means responsive to an increase in the voltage across the inverter to a predetermined level for protecting the inverter from excessive voltage levels, said dynamic braking means comprising a Schmitt trigger receiving an input proportional to the voltage across the inverter and producing an output when said voltage exceeds a predetermined maximum, and switching means responsive to the output of the Schmitt trigger for connecting a power resistor network across the inverter to protect the inverter from excessive voltages.

* * * * *